United States Patent [19]

Fujita et al.

[11] Patent Number: 4,484,693

[45] Date of Patent: Nov. 27, 1984

[54] APPARATUS FOR SUPPLYING COLUMNAR OR CYLINDRICAL ARTICLES

[75] Inventors: Takayuki Fujita, Hirakata; Yoshiaki Yoshida, Takatsuki; Toshiyuki Higashiura, Hirakata; Kunio Tanaka, Neyagawa, all of Japan

[73] Assignee: Matsushita Electric Industrial Co., Ltd., Osaka, Japan

[21] Appl. No.: 394,935

[22] PCT Filed: Oct. 28, 1981

[86] PCT No.: PCT/JP81/00305

§ 371 Date: Jun. 28, 1982

§ 102(e) Date: Jun. 28, 1982

[87] PCT Pub. No.: WO82/01538

PCT Pub. Date: May 13, 1982

[30] Foreign Application Priority Data

Oct. 30, 1980 [JP] Japan ............................. 55-153505
Dec. 17, 1980 [JP] Japan ............................. 55-179457

[51] Int. Cl.³ .............................................. B65H 5/16
[52] U.S. Cl. .................................... 221/119; 221/225
[58] Field of Search ............... 221/265, 217, 219, 273, 221/274, 119, 225, 254

Primary Examiner—Stanley H. Tollberg

Attorney, Agent, or Firm—Stevens, Davis, Miller & Mosher

[57] ABSTRACT

An apparatus for the high speed supply of individual circular or cylindrical articles such as chip resistors, shafts, pins and the like to a printed circuit board or other type of equipment is disclosed. The apparatus includes a first turn table, a vertically movable mounting table carried by the first turn table, a plurality of hoppers disposed in a circle on the mounting table, pipes movable into and out of the hoppers, chutes in the form of coiled springs, cylindrical chutes provided on the first turn table and connected to the pipes through the chutes in the form of coiled springs, escapement pushers having article holding holes disposed on the underside of the cylindrical chutes, a pickup chuck adapted to grip an article disposed in the article holding hole of a respective escapement pusher and to remove the article therefrom, and a push lever adapted to push each escapement pusher when each pusher is brought to a predetermined position as a result of rotation of said first turn table. The rotary design of the apparatus leads to a more rapid supply of articles and allows the apparatus to operate in a space smaller than that required for conventional apparatus.

2 Claims, 12 Drawing Figures

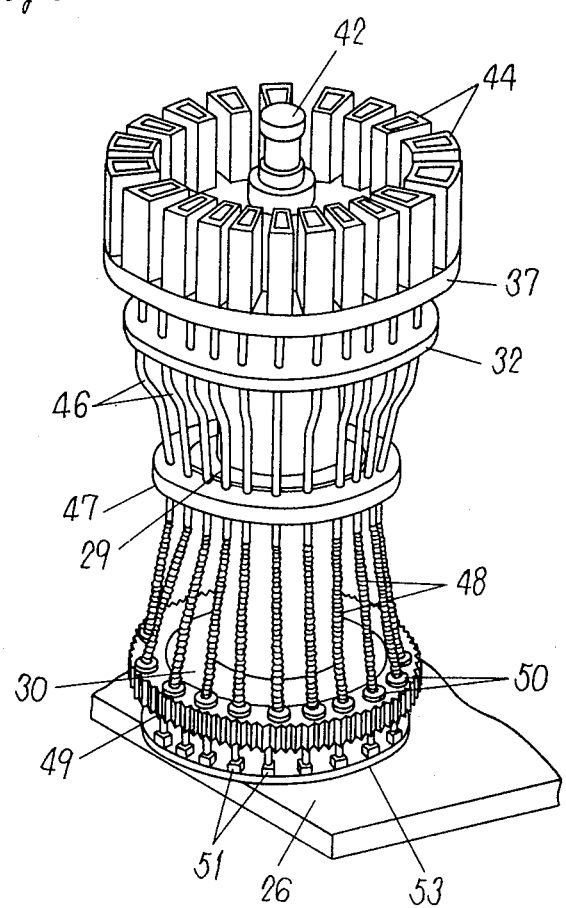

APPARATUS FOR SUPPLYING COLUMNAR OR CYLINDRICAL ARTICLES

TECNHICAL FIELD

The present invention relates to an apparatus for supplying columnar or cylindrical articles such as cylindrical chip resistors, shafts, pins or the like at high speeds to equipment such as an automatic mounting apparatus.

BACKGROUND ART

Recently, apparatus having a construction as shown in FIGS. 2 and 3 has been developed by the present inventors, as an apparatus for supplying columnar or cylindrical articles 1 (referred to simply as "article 1", hereinunder), such as cylindrical chip resistors as shown in FIG. 1.

More specifically, a base 4 is attached to the upper end of a shaft 3 extending vertically through a main body 2, and a cam follower 6 is fitted in a groove 5 formed on the side surface of the base 4. A lever 8 is connected at its one end to the cam follower 6 and is pivotally mounted at its mid portion on the main body 2, while the other end is connected to a pneumatic cylinder 7 so that the base 4 can be moved up and down by the actuation of the pneumatic cylinder 7. A plurality of hoppers 9 are disposed along straight lines on the base 4, and pipes 11 secured upright to the main body 2 are fitted in through holes 10 formed in the centers of lower surfaces of the hoppers 9, while chutes 12 in the form of coiled springs are connected to the lower ends of the pipes 11. The lower ends of the chutes 12 are connected to article holes 14 of an escapement block 13. A pusher 16 having article holding holes 15 is disposed in sliding contact with the underside of the escapement block 13 in such a manner as to be pushed by a push rod 17 and returned by a spring 18. A lower chute 20 provided at its end with a through hole 19 for receiving the articles 1 is disposed in contact with the underside of the pusher 16. A chuck 22 is connected to the lower end of each through hole 19 through a receptacle 21. A stopper 23 is provided on the lower portion of the chuck 22. The chuck 22 is constructed to be movable horizontally so as to be able to transfer the article to a pickup chuck 24 by which the article 1 is supplied to, for example, a printed circuit board board 25.

In this supplying apparatus, each pipe 11 is moved into and out of each hopper 9 accomodating a number of articles 1 by the base 4 which is moved up and down by the operation of the pneumatic cylinder 7, so that an article 1 comes into the pipe 11 and drops into the article 14 in the escapement block 13 through the chute 12. The article 1 then falls into the article holding hole 15 of the pusher 16 coaxial with the article hole 14. Then, as the push rod 17 is actuated, the pusher 16 with the articles 1 held therein is slid in order to convey the articles 1 into the through hole 19 of the lower chute 20, from which the articles 1 are fed into the chuck 22 through the receptacles 21.

With this arrangement, the hoppers 9 are arranged in alignment as shown in FIG. 4, so that a large space is occupied by the apparatus as a whole. If the articles 1 are picked up at one location by the chuck 22, the pick up operation will be effected by moving the set of hoppers. In such a case, it is required that a distance D through which the set of hoppers are moved from one extreme position to the other extreme position be twice the entire length of the set of hoppers. This arrangement disadvantageously requires a substantially long period of time for supplying a plurality of articles 1 of different types to a small printed circuit board or the like. Furthermore, it is difficult to increase the speed of supply due to the fact that articles 1 drop by gravity from the lower chute 20 to the chuck 22.

SUMMARY OF THE INVENTION

The present invention is directed toward an apparatus for supplying circular or cylindrical articles, said apparatus comprising a turn table, a vertically movable mounting table carried by the turn table, a plurality of hoppers disposed in a circle on the mounting table, pipes movable into and out of the hoppers, chutes in the form of coiled springs, cylindrical chutes provided on the turn table and connected to the pipes through the chutes in the form of coiled springs, and an escapement pusher having article holding holes and provided on the underside of the cylindrical chutes; wherein, as the escapement pusher is brought to a predetermined rotational position, the escapement pusher is displaced outwardly to permit the articles to be supplied to pickup chucks.

A principal object of the invention is to provide an apparatus that requires less space to operate and is capable of supplying articles at a high speed.

BRIEF DESCRIPTION OF THE DRAWINGS

FIG. 5 is a perspective view of an apparatus for supplying columnar or cylindrical articles in accordance with an embodiment of the invention;

BEST MODE OF CARRYING OUT THE INVENTION

Figure 1:
FIG. 1 is a perspective view of a conventional columnar or cylindrical article.
Figure 2:
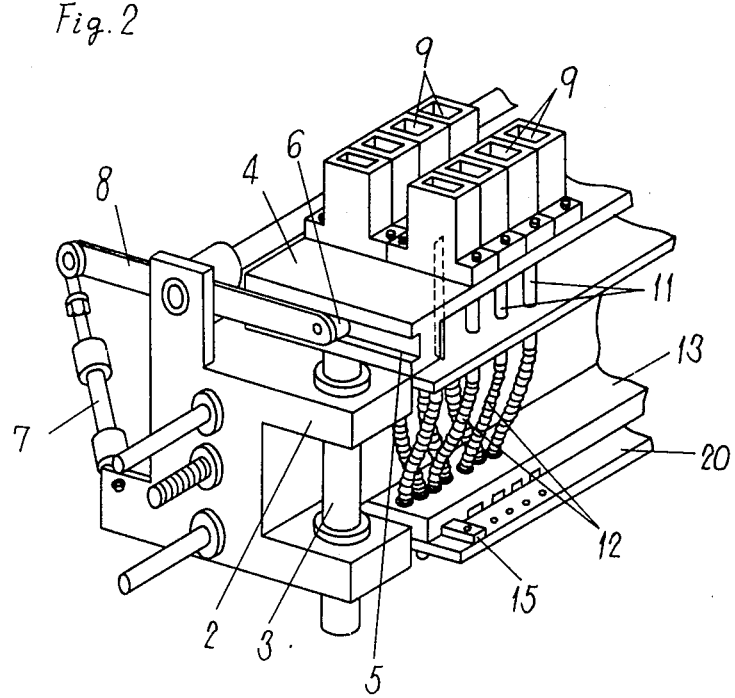
FIG. 2 is a perspective view of a recently developed apparatus for supplying columnar or cylindrical articles.
Figure 3:
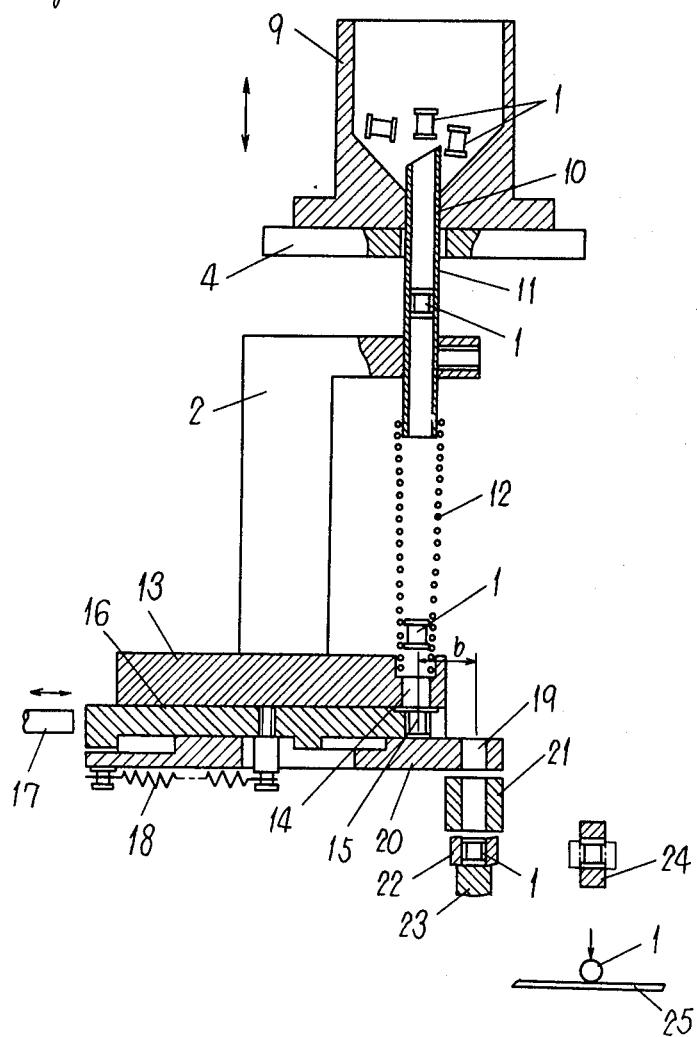
FIG. 3 is a sectional view of the apparatus of FIG. 2.
Figure 4:
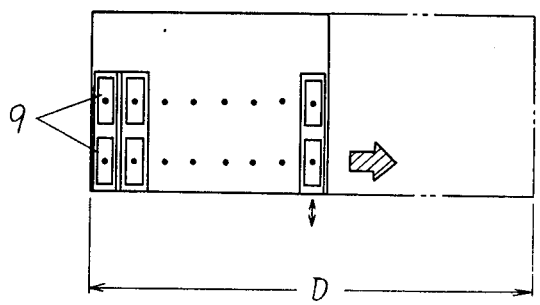
FIG. 4 is a top plan view of an arrangement of hoppers.
Figure 8:
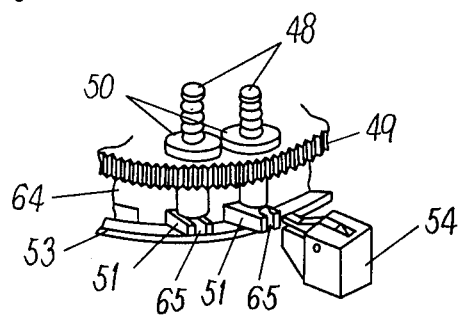
FIG. 8 is a perspective view of escapement pushers and a pickup chuck in the apparatus.
Figure 9:
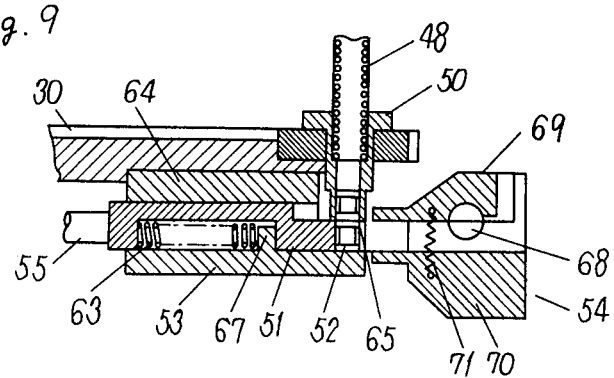
FIGS. 9 and 10 are sectional views of essential parts of the apparatus showing how the article is transferred from the escapement pusher to the pickup chuck.
Figure 10:
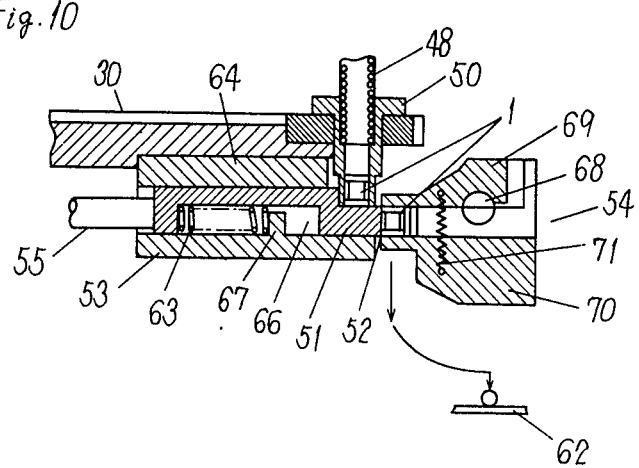
Figure 6:
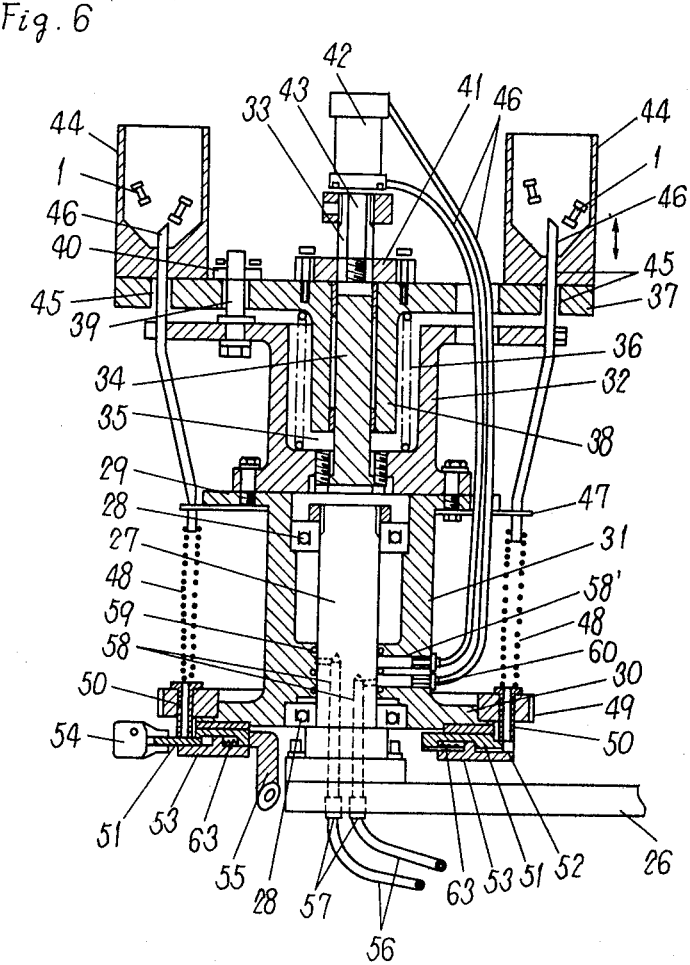
FIG. 6 is a sectional view of the apparatus of FIG. 5.
Figure 7:
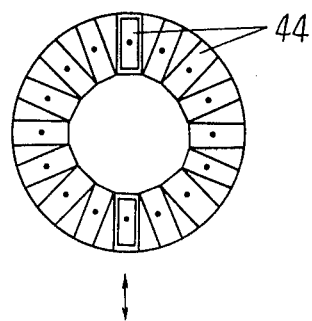
FIG. 7 is a top plan view of an arrangement of hoppers of the apparatus.
Figure 11:
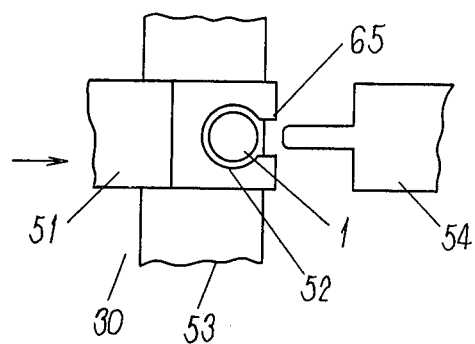
FIG. 11 is a top plan view of an essential part of the apparatus.
Figure 12:
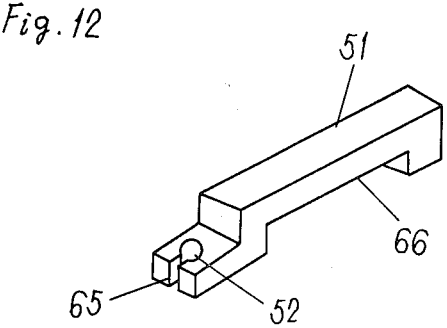
FIG. 12 is a perspective view of the escapement pusher.

Referring to FIGS. 5 thru 12, reference numeral 26 denotes a base to which is fixed a supporting column 27 extending upwardly therefrom. A turn table 31 provided at its upper and lower ends with flanges 29 and 30 is rotatably fitted on the supporting column 27 by means of bearings 28. A pipe support turn table 32 is fixed to the upper end flange 29 of the turn table 31. A shaft 34 formed at its upper portion with a slit 33 is fixed centrally of the pipe support turn table 32. A recess 35 formed in the central portion of the pipe support turn table 32 accomodates a compression spring 36, as well as lower boss 38 formed on the center of the mounting table 37.

A pin 39 is provided on the pipe support turn table 32 so as to project upwardly therefrom. The pin 39 is received by a bearing 40 provided in the mounting table 37. The pipe support turn table 32 and the mounting table 37 are rotatably joined to each other. Furthermore, a plate 41, adapted to fit in the slit 33 of the shaft 34, is fixed to the center of the mounting table 37. A pneumatic cylinder 42 is fixed to the upper end of the shaft 34. The pneumatic cylinder 42 has a rod 43 connected to the plate 41. The mounting table 37 is moved up and down relative to the shaft 34 as the pneumatic cylinder 42 operates.

A plurality of hoppers 44, each containing a multiplicity of parts 1, are arranged on a circle along the periphery of the upper surface of the mounting plate 37. Pipes 46 having obliquely cut upper ends are fitted in through holes 45 formed in the hoppers 44 and the mounting table 37. The pipes 46 are supported by the pipe support turn table 32 and are fixed at their lower ends to a holding plate 47 which is fixed to the upper end flange 29 of the turn table 31. Chutes 48 in the form of coiled springs are connected to the lower ends of respective pipes 46, while the lower ends of the chutes 48 are connected to cylindrical chutes 50 embedded in the lower end flange 30 of the turn table 31, a peripheral surface of the lower end flange 30 being formed as a gear 49.

Escapement pushers 51 are slidably held by escapement blocks 64 secured to the lower end flange 30 of the turn table 31, and are provided with article holding holes 52 corresponding to the lower parts of the cylindrical chutes 50. A retainer plate 53 is provided on the underside of the escapement pusher 51 so as to prevent the articles 1 from being dropped from the article holding holes 52. A push lever 55 adapted to push each escapement pusher 51 so as to displace the article holding hole 52 thereof towards the pickup chuck 54 is disposed at a certain rotational position of the turn table 31 corresponding to the pickup chuck 54. To explain in more detail the escapement pusher 51 and the pickup chuck 54, the article holding hole 52 of each escapement pusher 51 is formed with a notch 65 having a width smaller than the outer diameter of the article 1. The escapement pusher 51 is provided at its underside with a recess 66 which receives a compression spring 63 for causing a returning sliding motion of the escapement pusher 51. The compression spring 63 is engaged at its one end by one end of the recess 66, while the other end of the compression spring 63 is engaged by a projection 67 which is provided on the upper surface of the retainer plate 53 fixed to the underside of the escapement block 64 and projects into the recess 66 of the escapement pusher 51.

The pickup chuck 54 has two jaws 69 and 70 swingable vertically around a pivot shaft 68, and a tension spring 71 adapted to normally urge the jaws 69 and 70 in the closing direction. The ends of the jaws 69 and 70 for clamping the article 1 have a width small enough to enter the notch 65 contiguous to the article holding hole 52 of the escapement pusher 51. The pickup chuck 54 is adapted to be rotated 90° in the counterclockwise direction to supply the article 1 thereon to a printed circuit board 62 or the like.

Stationary hoses 56 are connected to the supporting column 27 through pipe joints 57. Communication bores 58 provided in the supporting column 27 and the communication bores 58' provided at the center of the turn table 31 are communicated with each other through "O" rings 59. Pipes 61 are connected at their one end to the communication bores 58' through pipe joints 60 and at their other end to the above-mentioned pneumatic cylinder 42 to permit the supply of compressed air to the pneumatic cylinder 42.

As the pneumatic cylinder 42 is supplied with compressed air, the rod 43 is moved into and out of the pneumatic cylinder 42 to move the mounting table 37 with respect to the shaft 34 so that the pipes 46 are moved into and out of the hoppers 44 to receive the articles 1. The articles taken into the pipe 46 are fed to the cylindrical chutes 50 through the chutes 48. Each article fed into the cylindrical chute 50 is then introduced into the article holding hole 52 of the cylindrical chute 50 which is held in alignment with the underside of the cylindrical chute 50 when the push lever 55 is not in operation. As the turn table 31 is rotated to bring the article 1 received by the article holding hole 52 to a position opposite the pickup chuck 54, the push lever 55 starts its operation to cause a sliding movement of the escapement pusher 51 while compressing the compression spring 63. As a result of the sliding movement of the escapement pusher 51, the article holding hole 52 holding the article 1 is moved into the pickup 54, of which the jaws 69 and 70 are held in the opened position. Then, the pickup chuck 54 is closed to chuck the upper and lower ends of the article, and is rotated counterclockwise to pick up the article 1 from the article holding hole 52 of the escapement pusher 51 and to deliver the article to the printed circuit board 62 or the like.

Thereafter, the push lever 55 is returned to its original position to permit the escapement pusher 51 to be slidably returned by the resilient force of the compression spring 63. Meanwhile, the pickup chuck 54 is rotated to the starting position to be ready for the next cycle of operation.

INDUSTRIAL APPLICABILITY

As has been described, in the apparatus of the invention for supplying columnar or cylindrical articles, it is possible to save installation space since the hoppers are provided in a circular arrangement. It is also possible to pick up the articles at only one pick up station by the use of the turn table. In addition, the rotary type construction of the apparatus requires only a short time for rotation to the position of the pickup chuck, thereby eliminating any waiting time in automatic loading apparatus. Thus, it is possible to supply the articles at a speed of 0.6 seconds per piece which is more than two times faster than the speed achieved with conventional apparatus. The speed of supply of articles can also be increased by the fact that articles can be forcibly supplied by means of the escapement pusher, except for the gravity drop from the hopper to the escapement pusher. Thus, various effects and industrial advantages are brought about by the invention.

We claim:

1. An apparatus for supplying columnar or cylindrical articles, adapted to supply, piece by piece, columnar or cylindrical articles which are fed in a row, said apparatus being constructed to include a first turn table, a pipe support turn table coupled to the upper side of said first turn table, a shaft connected to the center of said pipe support turn table, a mounting table coupled to said shaft in the rotational direction but slidably up and down along said shaft, a plurality of hoppers arranged in a circle on said mounting table, each hopper accomodating a multiplicity of columnar or cylindrical articles, pipes fixed to said pipe support turn table and inserted into the through holes formed at the centers of the underside of said hoppers, cylindrical chutes provided on said turn table and connected to said pipes through chutes in the form of coiled springs, escapement pushers each having an article holding hole and disposed on the underside of said cylindrical chutes, a pickup chute adapted to grip an article disposed in the article holding hole of a respective escapement pusher and to remove the article therefrom, and a push lever adapted to push said each escapement pusher when said each escapement pusher is brought to a predetermined position as a result of rotation of said first turn table, thereby transferring said columnar or cylindrical article held by said article holding hole to said pickup chuck.

2. An apparatus for supplying columnar or cylindrical articles according to claim 1, wherein said article holding hole of said escapement pusher is provided with a notch having a width smaller than the outer diameter of said columnar or cylindrical article, said pickup chuck disposed at the projecting side of said escapement pusher having an end adapted for insertion into said notch, whereby said columnar or cylindrical article is picked up from said article holding hole by a rotation of said pickup chuck while being chucked by said pickup chuck.

* * * * *